(12) United States Patent
Xu et al.

(10) Patent No.: US 12,738,863 B2
(45) Date of Patent: Sep. 15, 2026

(54) POWER CONVERSION DEVICE COMPRISING THREE-LEVEL INVERTER AND BALANCE CIRCUIT AND CONTROL METHOD THEREOF

(71) Applicant: Delta Electronics (Shanghai) Co., Ltd., Shanghai (CN)

(72) Inventors: Feidong Xu, Shanghai (CN); Bin Wang, Shanghai (CN); Yueran Zhang, Shanghai (CN); Heng Wang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 131 days.

(21) Appl. No.: 18/532,960

(22) Filed: Dec. 7, 2023

(65) Prior Publication Data

US 2024/0195178 A1 Jun. 13, 2024

(30) Foreign Application Priority Data

Dec. 12, 2022 (CN) ........................ 202211598878.0

(51) Int. Cl.
*H02M 7/483* (2007.01)
*H02J 3/38* (2006.01)
(Continued)

(52) U.S. Cl.
CPC ............ *H02M 7/4833* (2021.05); *H02J 3/38* (2013.01); *H02M 7/487* (2013.01); (Continued)

(58) Field of Classification Search
CPC ............... H02M 7/4833; H02M 7/487; H02M 7/797–81; H02J 3/32–322; H02J 3/38–50; H02J 2300/24–26
See application file for complete search history.

(56) References Cited

U.S. PATENT DOCUMENTS 9,515,577 B2 12/2016 Kidera et al.
2010/0172166 A1* 7/2010 Singh ............... H02M 7/53871 363/131
(Continued)

FOREIGN PATENT DOCUMENTS

CN 102761285 B * 8/2015
CN 211701886 U 10/2020
(Continued)

OTHER PUBLICATIONS

English machine translation of CN114498710A published May 13, 2022 (Year: 2022).*

*Primary Examiner* — Rexford N Barnie
*Assistant Examiner* — David A Shiao
(74) *Attorney, Agent, or Firm* — KIRTON McCONKIE; Evan R. Witt

(57) ABSTRACT

A power conversion device and a control method thereof are provided. The power conversion device includes a three-level inverter, positive and negative DC terminals, first and second capacitors, a balance circuit, a bidirectional DC-DC converter and a controller. The three-level inverter has two DC terminals coupled to the positive and negative DC terminals respectively. Two terminals of the first capacitor are coupled to the positive DC terminal and a capacitor midpoint respectively. Two terminals of the second capacitor are coupled to the capacitor midpoint and the negative DC terminal respectively. The balance circuit is electrically connected between the positive and negative DC terminals and has a neutral terminal electrically connected to the capacitor midpoint. The bidirectional DC-DC converter is electrically connected to the DC terminals. The controller controls the balance circuit according to two capacitor voltages across the first and second capacitors respectively to keep the two capacitor voltages equal.

13 Claims, 8 Drawing Sheets

(51) Int. Cl.

| | |
|---|---|
| ***H02M 7/487*** | (2007.01) |
| ***H02M 7/5387*** | (2007.01) |
| ***H02M 7/797*** | (2006.01) |
| *H02J 3/01* | (2006.01) |
| *H02J 101/24* | (2026.01) |
| *H02M 3/335* | (2006.01) |

(52) U.S. Cl.

CPC ....... *H02M 7/53871* (2013.01); *H02M 7/797* (2013.01); *H02J 3/01* (2013.01); *H02J 2101/24* (2026.01); *H02M 3/33584* (2013.01)

(56) References Cited

U.S. PATENT DOCUMENTS

2015/0288296 A1* 10/2015 Kidera ................ H02M 7/5387 363/132
2016/0322916 A1* 11/2016 Hao ........................ H02M 7/48
2017/0288574 A1* 10/2017 Agirman ................. H02M 1/32
2018/0019685 A1* 1/2018 Yamashita .............. H02M 1/32
2019/0181774 A1* 6/2019 Liu ..................... H02M 7/4833
2021/0257919 A1* 8/2021 Hayashi .............. H02M 3/1584
2023/0012882 A1* 1/2023 Katcha ................ H02M 7/4833
2024/0097550 A1* 3/2024 Rosado ................. H02M 7/483
2024/0195175 A1* 6/2024 Shahriar ................. H02J 3/381
2024/0213885 A1* 6/2024 Facanha De Oliveira .................. H02M 5/4585
2025/0023487 A1* 1/2025 Michalczuk .......... H02M 7/487

FOREIGN PATENT DOCUMENTS

CN 112544033 A 3/2021
CN 113489326 A * 10/2021 .............. H02M 1/14
CN 114498710 A * 5/2022 .............. B60L 53/31
WO WO-2024016056 A1 * 1/2024 ............ H02M 7/797

* cited by examiner

POWER CONVERSION DEVICE COMPRISING THREE-LEVEL INVERTER AND BALANCE CIRCUIT AND CONTROL METHOD THEREOF

CROSS-REFERENCE TO RELATED APPLICATION

This application claims priority to China Patent Application No. 202211598878.0, filed on Dec. 12, 2022, the entire contents of which are incorporated herein by reference for all purposes.

FIELD

The present disclosure relates to a power conversion device and a control method thereof, and more particularly to a power conversion device and a control method thereof capable of balancing the midpoint voltage.

BACKGROUND

A photovoltaic (PV) integration solution integrated with solar power generation, energy storage, and charging can realize the basic balance between local energy production and energy load through energy storage and optimized configuration, and the PV integration solution can operate independently. Thereby, "spontaneous self-use and surplus power storage" is achieved, so as to alleviate a power generation instability of new energy and an impact of charging pile power consumption on an electrical grid. In terms of energy consumption, the PV integration solution uses an energy storage system to charge the power battery to improve energy conversion efficiency and reduce electricity costs. The energy storage system is used to absorb surplus power during periods of low electricity consumption and to provide power for supporting fast charging loads during periods of high electricity consumption. Meanwhile, photovoltaic or wind power generation system is used to supplement electricity power. Consequently, the load of the electrical grid of charging stations during periods of high electricity consumption can be effectively reduced, the operating efficiency of the system is improved, and also the auxiliary service function is provided to the electrical grid.

Vehicle-to-grid (V2G) is a typical application. Different from the conventional one-way charging pile of the electrical grid to an on-board battery, the V2G system can realize bidirectional energy flow. If the on-board battery needs to be charged, the electrical energy flows from the electrical grid to the vehicle. When the electric vehicle is not in use, the electric energy in the on-board battery may be provided to the electrical grid. Further, when the electrical grid is out of power, the on-board battery may be connected to provide power for household loads.

When the electrical grid is out of power, the V2G system supplies power to household loads through the connected on-board battery, which is called off-grid mode. Since the electrical grid cannot be used for balancing in the off-grid mode, the midpoint potential may be shifted when the load is unbalanced, and such shift would cause the distortion of the output voltage waveform. In the conventional approach, only software algorithms are used to regulate the balance of the midpoint voltage in the off-grid mode. However, this approach has the following two limitations.

Firstly, when using the software algorithm to regulate the balance of the midpoint voltage, the magnitude of the current in positive or negative half cycle is increased to regulate the midpoint voltage. Therefore, in the case of a small load current, the regulation capability is obviously limited so that the regulation effect is not as expected. Further, when the load is a rectified half-wave load, the software algorithm would completely lose the regulation capability since the current only has positive or negative half cycle.

Therefore, there is a need of providing a power conversion device and a control method thereof in order to overcome the drawbacks of the conventional technologies.

SUMMARY

The present disclosure provides a power conversion device and a control method thereof for balancing the midpoint voltage by controlling switches of a balance circuit. Further, the capability of balancing the midpoint voltage would not be limited under any load condition and thus has great reliability.

In accordance with an aspect of the present disclosure, a power conversion device is provided. The power conversion device includes a three-level inverter, a first positive DC terminal, a first negative DC terminal, a first capacitor, a second capacitor, a balance circuit, a bidirectional DC-DC converter and a controller. The three-level inverter has a first AC terminal, a second AC terminal and two DC terminals, and the three-level inverter is configured for AC-DC power conversion. The first positive DC terminal and the first negative DC terminal are coupled to the two DC terminals of the three-level inverter respectively. A capacitor midpoint is between the first capacitor and the second capacitor. Two terminals of the first capacitor are coupled to the first positive DC terminal and the capacitor midpoint respectively, and two terminals of the second capacitor are coupled to the capacitor midpoint and the first negative DC terminal respectively. The balance circuit is electrically connected between the first positive DC terminal and the first negative DC terminal, and the balance circuit has a neutral terminal electrically connected to the capacitor midpoint. The bidirectional DC-DC converter is configured for DC-DC voltage conversion. A first side of the bidirectional DC-DC converter is electrically connected to the first positive DC terminal and the first negative DC terminal. When the three-level inverter receives an AC power, a second side of the bidirectional DC-DC converter provides a DC power correspondingly. When the second side of the bidirectional DC-DC converter receives a DC power, the three-level inverter provides an AC power correspondingly. The controller is configured to control the three-level inverter, the balance circuit and the bidirectional DC-DC converter. The controller controls switches of the balance circuit according to a first capacitor voltage across the first capacitor and a second capacitor voltage across the second capacitor to keep the first capacitor voltage and the second capacitor voltage equal.

In accordance with another aspect of the present disclosure, a control method of a power conversion device is provided. The control method includes steps of: (a) providing a power conversion device, wherein the power conversion device comprises a three-level inverter, a first positive DC terminal, a first negative DC terminal, a first capacitor, a second capacitor, a balance circuit and a bidirectional DC-DC converter, the three-level inverter has a first AC terminal, a second AC terminal and two DC terminals, the three-level inverter is configured for AC-DC power conversion, the first positive DC terminal and the first negative DC terminal are coupled to the two DC terminals respectively, a capacitor midpoint is between the first capacitor and the second capacitor, two terminals of the first capacitor are coupled to the first positive DC terminal and the capacitor midpoint respectively, two terminals of the second capacitor are coupled to the capacitor midpoint and the first negative DC terminal respectively, the balance circuit is electrically connected between the first positive DC terminal and the first negative DC terminal, the balance circuit has a neutral terminal electrically connected to the capacitor midpoint, the bidirectional DC-DC converter is configured for DC-DC voltage conversion, a first side of the bidirectional DC-DC converter is electrically connected to the first positive DC terminal and the first negative DC terminal, when the three-level inverter receives an AC power, a second side of the bidirectional DC-DC converter provides a DC power correspondingly, and when the second side of the bidirectional DC-DC converter receives a DC power, the three-level inverter provides an AC power correspondingly; and (b) controlling switches of the balance circuit according to a first capacitor voltage across the first capacitor and a second capacitor voltage across the second capacitor to keep the first capacitor voltage and the second capacitor voltage equal.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
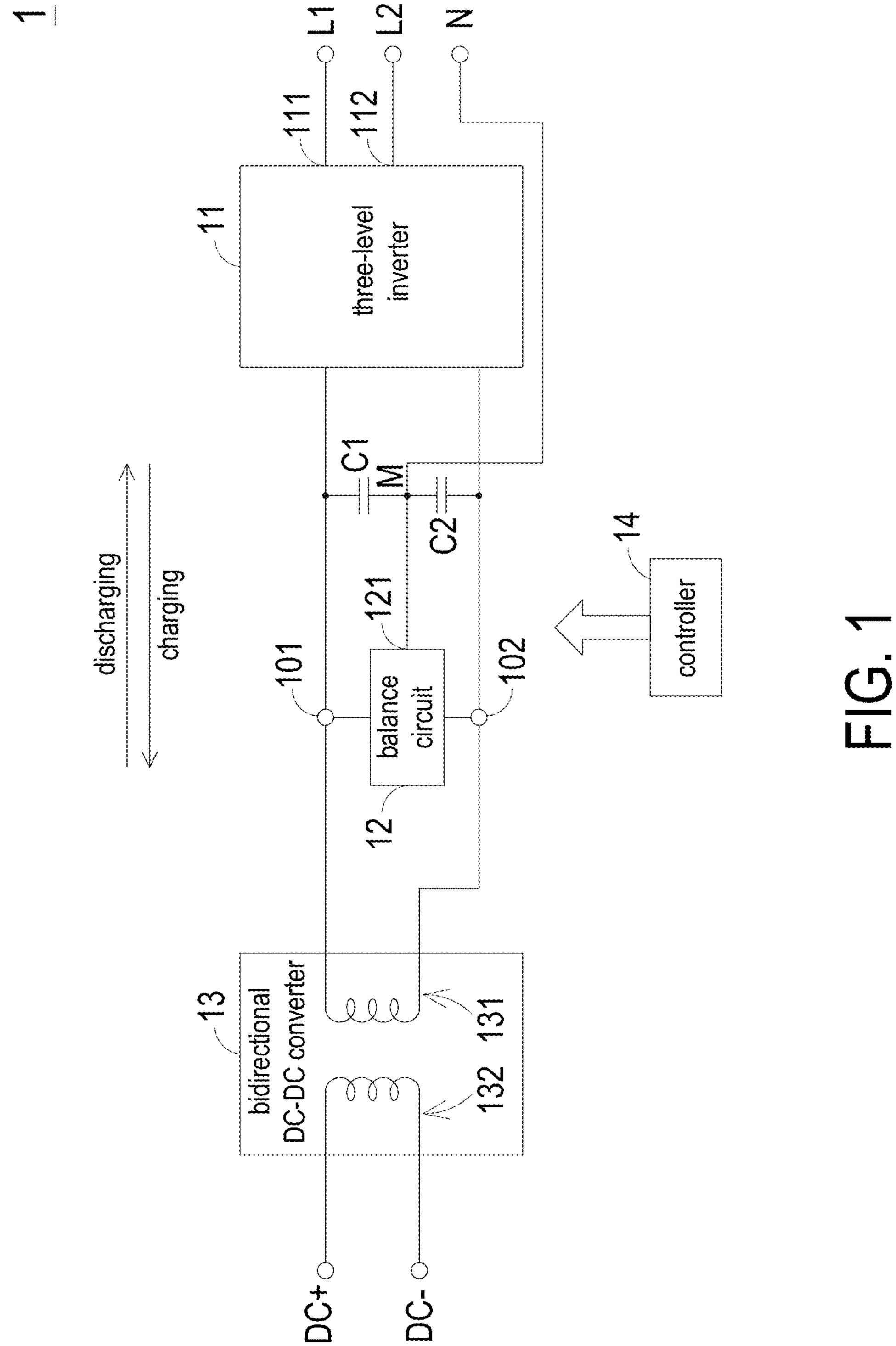
FIG. 1 is a schematic circuit diagram illustrating a power conversion device according to an embodiment of the present disclosure.

FIG. 1 is a schematic circuit diagram illustrating a power conversion device according to an embodiment of the present disclosure. As shown in FIG. 1, a power conversion device 1 includes a three-level inverter 11, a first positive DC terminal 101, a first negative DC terminal 102, a first capacitor C1, a second capacitor C2, a balance circuit 12, a bidirectional DC-DC converter 13 and a controller 14. The three-level inverter 11 includes a first AC terminal 111, a second AC terminal 112 and two DC terminals (a positive terminal and a negative terminal), and the three-level inverter 11 is configured for AC-DC power conversion. The first positive DC terminal 101 and the first negative DC terminal 102 are coupled to the two DC terminals of the three-level inverter 11 respectively. A capacitor midpoint M is between the first capacitor C1 and the second capacitor C2. Two terminals of the first capacitor C1 are coupled to the first positive DC terminal 101 and the capacitor midpoint M respectively, and two terminals of the second capacitor C2 are coupled to the capacitor midpoint M and the first negative DC terminal 102 respectively. The balance circuit 12 is electrically connected between the first positive DC terminal 101 and the first negative DC terminal 102, and the balance circuit 12 has a neutral terminal 121 which is electrically connected to the capacitor midpoint M. The bidirectional DC-DC converter 13 is configured for DC-DC voltage conversion. The bidirectional DC-DC converter 13 has a first side 131 and a second side 132, and the first side 131 is electrically connected to the first positive DC terminal 101 and the first negative DC terminal 102.

When the three-level inverter 11 receives an AC power, the second side 132 of the bidirectional DC-DC converter 13 provides a DC power correspondingly. When the second side 132 of the bidirectional DC-DC converter 13 receives a DC power, the three-level inverter 11 provides an AC power correspondingly. Specifically, when the first AC terminal 111 and the second AC terminal 112 of the three-level inverter 11 receive the AC power, the AC power is converted into the DC power by the three-level inverter 11, and then the DC power is outputted by the DC terminals of the three-level inverter 11. Then, the DC power is transmitted to the first side 131 of the bidirectional DC-DC converter 13 through the balance circuit 12, and the bidirectional DC-DC converter 13 converts the DC power and provides the converted DC power at the second side 132 thereof. On the contrary, when the second side 132 of the bidirectional DC-DC converter 13 receives the DC power, the bidirectional DC-DC converter 13 converts the DC power and provides the converted DC power at the first side 131 thereof. Then, the converted DC power is transmitted to the DC terminals of the three-level inverter 11 through the balance circuit 12, and then the converted DC power is converted into the AC power by the three-level inverter 11. Finally, the first AC terminal 111 and the second AC terminal 112 of the three-level inverter 11 provide the AC power.

Compared with the conventional two-level inverter, when the three-level inverter 11 of the present disclosure provides the AC power, the output ripple current is smaller. Accordingly, in the present disclosure, the output inductor and capacitor of the power conversion device 1 can be relatively small, thereby reducing the volume of overall device and the cost. Furthermore, in the three-level inverter 11 of the present disclosure, since the loss of a single switch is small, the efficiency of the switch is improved, and the ripple current is reduced. Hence, the ripple current outputted to the power grid is reduced to a minimum, thereby ensuring no attenuation of the output current and ensuring the harmonics to be low at the same time.

The controller 14 is configured to control the three-level inverter 11, the balance circuit 12 and the bidirectional DC-DC converter 13. The controller 14 controls the switches of the balance circuit 12 according to the first capacitor voltage across the first capacitor C1 and the second capacitor voltage across the second capacitor C2 to keep the first and second capacitor voltages equal. Thereby, the power conversion device 1 of the present disclosure realize the balance of the midpoint voltage (i.e., the voltage of the capacitor midpoint M) by controlling the switches of the balance circuit 12. Moreover, the capability of balancing the midpoint voltage of the power conversion device 1 would not be affected under any load condition and thus has great reliability.

Figure 2:
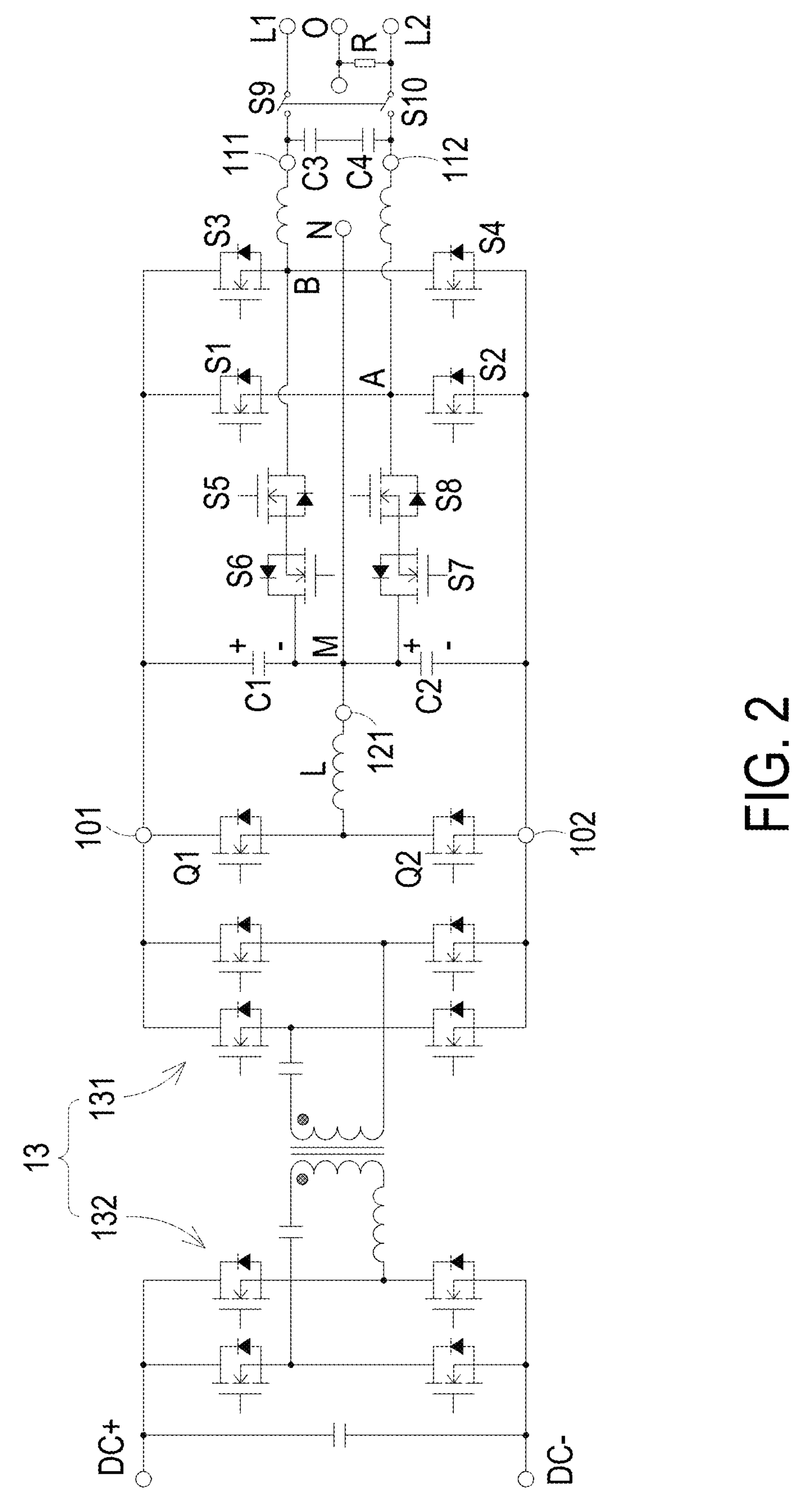
FIG. 2 schematically shows an implementation of the power conversion device of FIG. 1.

In addition, the power conversion device 1 has a second positive DC terminal DC+, a second negative DC terminal DC− and AC terminals L1, L2, N and O (as shown in FIGS. 1 and 2). The second positive DC terminal DC+ and the second negative DC terminal DC− are configured to be electrically connected to an on-board power supply of an electric vehicle, and the AC terminals L1, L2 and O are configured to be electrically connected to an electrical grid. In the grid-connected mode, the AC terminal L1 or L2 and the AC terminal O are electrically connected to the electrical grid, and the power conversion device 1 may realize the bidirectional electric energy exchange between the on-board power supply and the electrical grid. In the off-grid mode, the AC terminals L1, L2 and N are electrically connected to the household loads, and the power conversion device 1 may use the electric energy stored in the on-board power supply to supply power to the household loads, and the household loads may be electrically connected to the AC terminals L1 and N, or the AC terminals L2 and N. In FIG. 1, the directions of electric energy transmission during charging and discharging the on-board power supply are exemplified by arrow lines.

FIG. 2 schematically shows an implementation of the power conversion device of FIG. 1. As shown in FIG. 2, in an embodiment, the three-level inverter 11 includes a first switch S1, a second switch S2, a third switch S3 and a fourth switch S4. Two terminals of the first switch S1 are electrically connected to the first positive DC terminal 101 and the first switch midpoint A respectively. Two terminals of the second switch S2 are electrically connected to the first switch midpoint A and the first negative DC terminal 102 respectively. Two terminals of the third switch S3 are electrically connected to the first positive DC terminal 101 and the second switch midpoint B respectively. Two terminals of the fourth switch S4 are electrically connected to the second switch midpoint B and the first negative DC terminal 102 respectively. The first switch midpoint A is coupled to the first AC terminal 111, and the second switch midpoint B is coupled to the second AC terminal 112.

In an embodiment, the three-level inverter 11 further includes a plurality of regulation switches electrically connected in series between the first switch midpoint A and the second switch midpoint B, such as the four regulation switches S5, S6, S7 and S8 shown in FIG. 2, but the actual number of regulation switches is not limited thereto. The controller 14 regulates the potentials at the first AC terminal 111 and the second AC terminal 112 by controlling the plurality of switches S5, S6, S7 and S8, thereby increasing the number of possible potentials that can be provided by the three-level inverter 11, reducing ripple, and increasing efficiency. In an embodiment, a control signal of the regulation switch S5 is the same as a control signal of the regulation switch S6, and a control signal of the regulation switch S7 is the same as a control signal of the regulation switch S8. In other words, the regulation switches S5 and S6 share the same driving, and the regulation switches S7 and S8 share the same driving. In addition, in some other embodiments, as shown in FIG. 3, the regulation switches S5 and S6 may be replaced by a single bidirectional GaN regulation switch S50, and the regulation switches S7 and S8 may be replaced by a single bidirectional GaN regulation switch S70, thereby further simplifying the circuit and reducing the cost.

Figure 3:
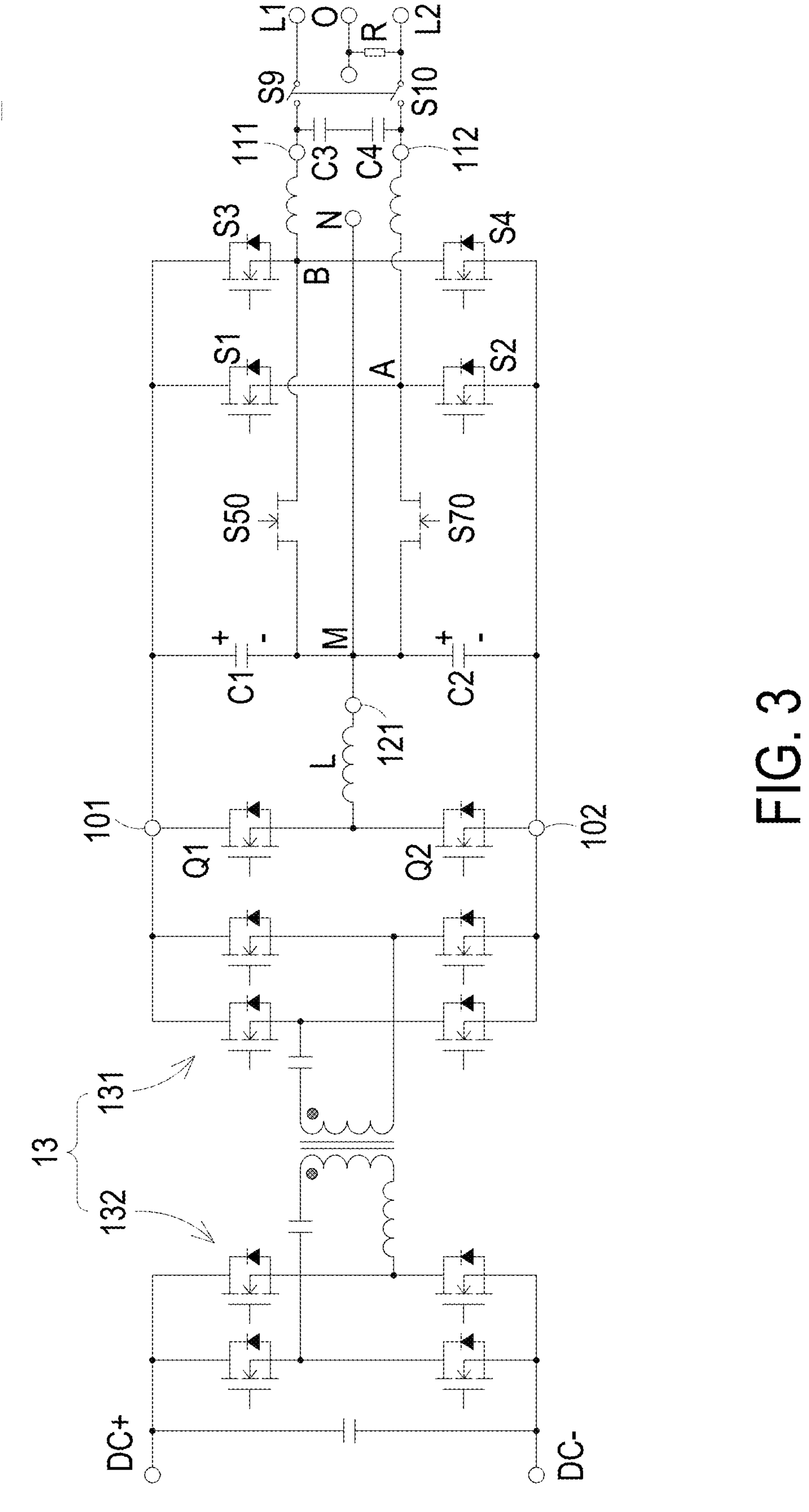
FIG. 3 schematically shows another implementation of the power conversion device of FIG. 1.

Moreover, the bidirectional DC-DC converter 13 of the present disclosure can be any converter capable of bidirectional DC-DC conversion and the specific topology thereof is not limited to the example shown in FIG. 2 and FIG. 3.

Please refer to FIG. 2 again. In an embodiment, the balance circuit 12 includes a first balance switch Q1, a second balance switch Q2 and an inductor L. A first terminal of the first balance switch Q1 is electrically connected to the first positive DC terminal 101, and a second terminal of the first balance switch Q1 is electrically connected to a first terminal of the second balance switch Q2 and a first terminal of the inductor L. A second terminal of the second balance Q2 is electrically connected to the first negative DC terminal 102, and a second terminal of the inductor L is electrically connected to the neutral terminal 121. A control signal of the first balance switch Q1 is complementary to a control signal of the second balance switch Q2.

In the off-grid mode, the voltage between the first positive DC terminal 101 and the first negative DC terminal 102 (i.e., the sum of the first capacitor voltage and the second capacitor voltage) is assumed to be Vbus. The controller 14 periodically samples the voltage of the capacitor midpoint M, compares the sampling result with Vbus/2, and regulates the duty ratio of the control signal of the first balance switch Q1 accordingly. Thereby, the capacitance values of the first capacitor C1 and the second capacitor C2 are regulated to maintain the voltage of the capacitor midpoint M at Vbus/2. Consequently, the power conversion device 1 can still operate normally when the load is unbalanced.

Figure 4:
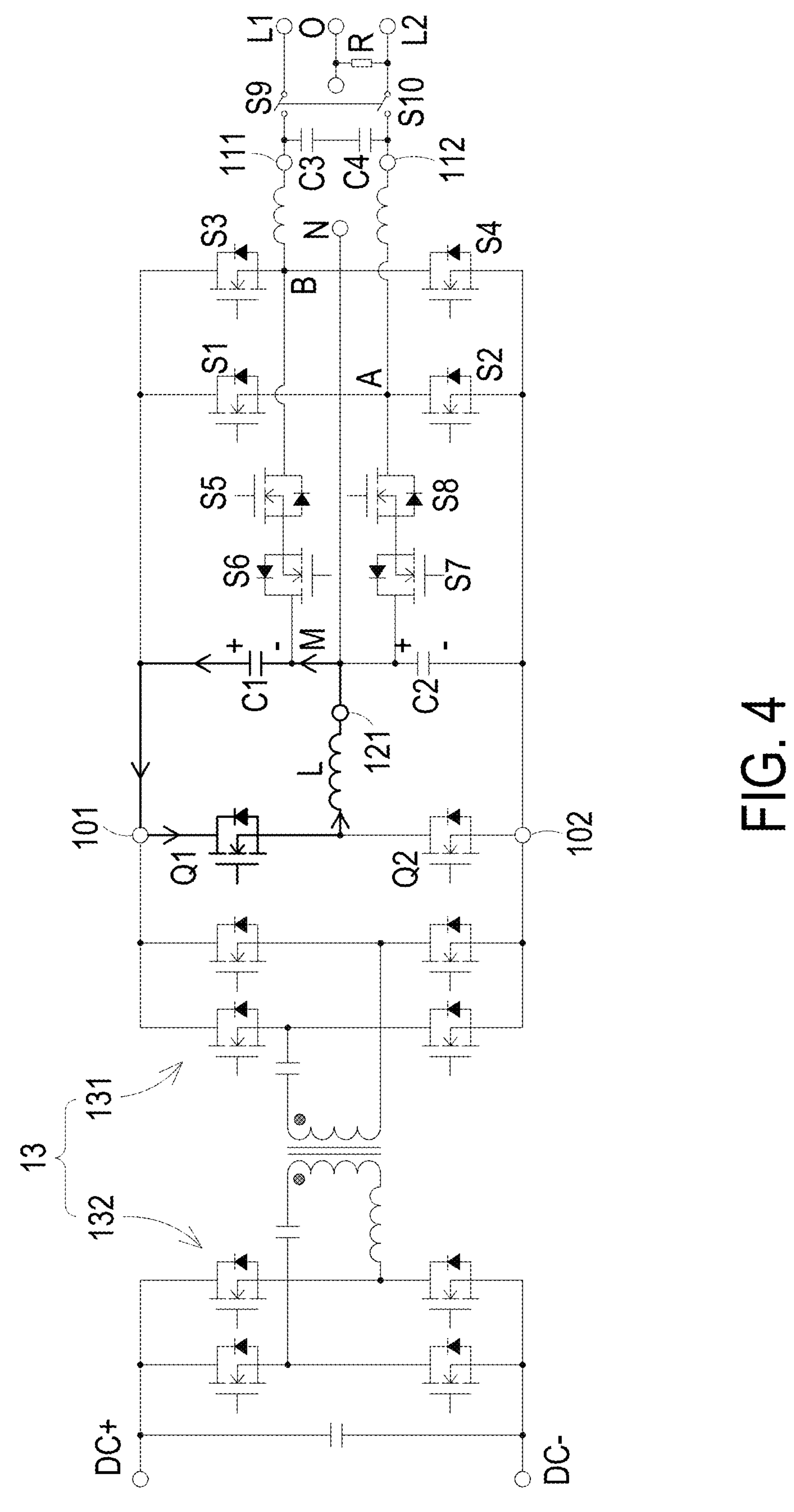
FIGS. 4 and 5 schematically show a flow direction of a current in the balance circuit of FIG. 2 when the voltage of the capacitor midpoint is unbalanced.
Figure 5:
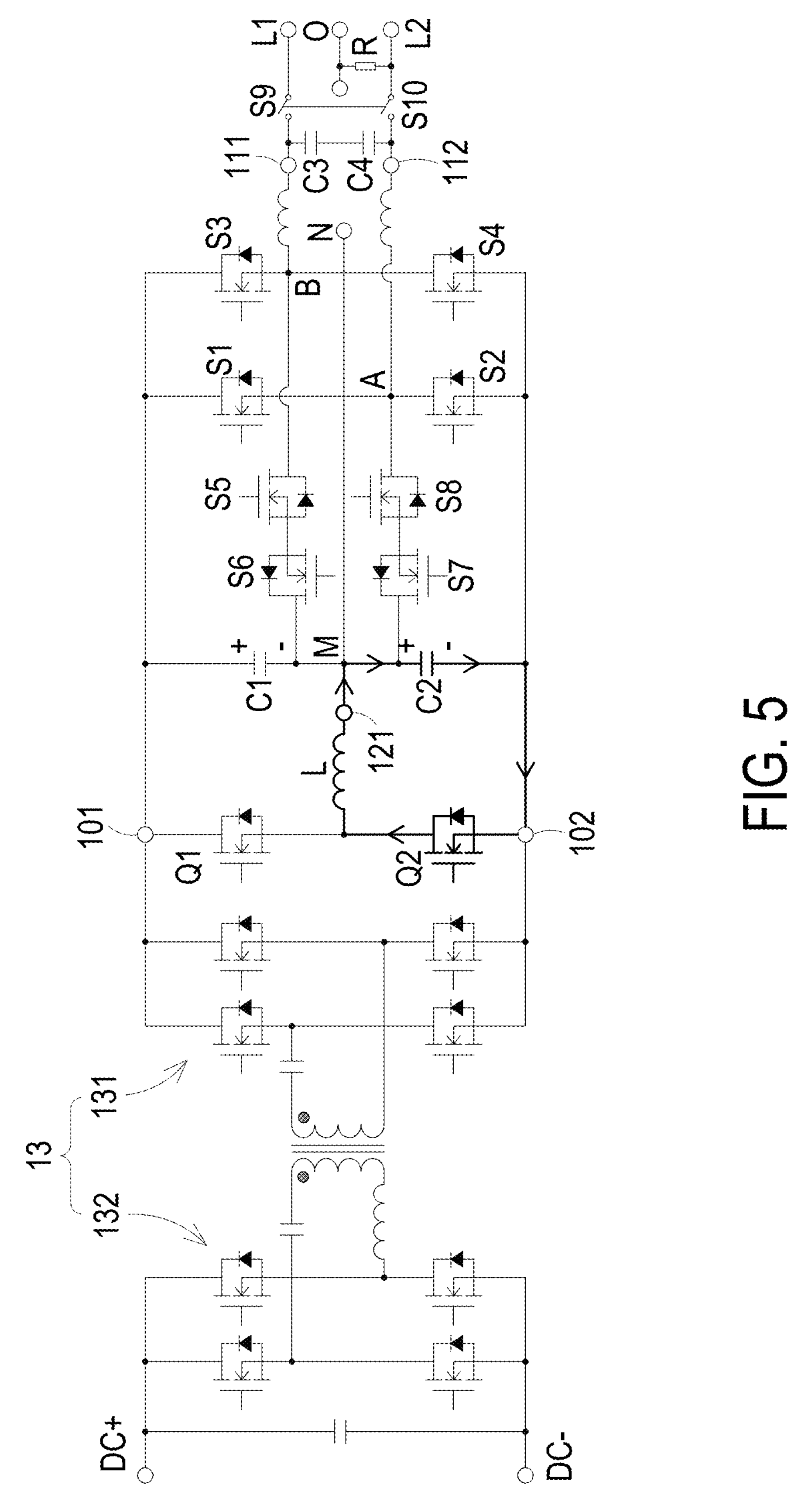

In fact, when the voltage of the capacitor midpoint M is unbalanced (i.e., not equal to Vbus/2), the following two situations may occur, and the flow direction of the current in the balance circuit 12 is shown in FIG. 4 and FIG. 5.

In the first situation, the load during the positive half cycle of voltage is greater than the load during the negative half cycle of voltage, resulting in the drop of the first capacitor voltage and the rise of the second capacitor voltage. Under this circumstance, the duty ratio of the control signal of the first balance switch Q1 is controlled to be greater than 0.5 so as to decrease the second capacitor voltage for maintaining the balance of the voltage of the capacitor midpoint M.

In the second situation, the load during the negative half cycle of voltage is greater than the load during the positive half cycle of voltage, resulting in the rise of the first capacitor voltage and the drop of the second capacitor voltage. Under this circumstance, the duty ratio of the control signal of the first balance switch Q1 is controlled to be less than 0.5 so as to increase the second capacitor voltage for maintaining the balance of the voltage of the capacitor midpoint M.

In another embodiment, when the voltage of the capacitor midpoint M is unbalanced, the duty ratio of the control signal of the first balance switch Q1 is controlled to be maintained at 0.5, and the voltage of the capacitor midpoint M is regulated through BUCK-BOOST regulation. The first balance switch Q1 would be turned off as the voltage of the capacitor midpoint M is balanced.

Figure 6:
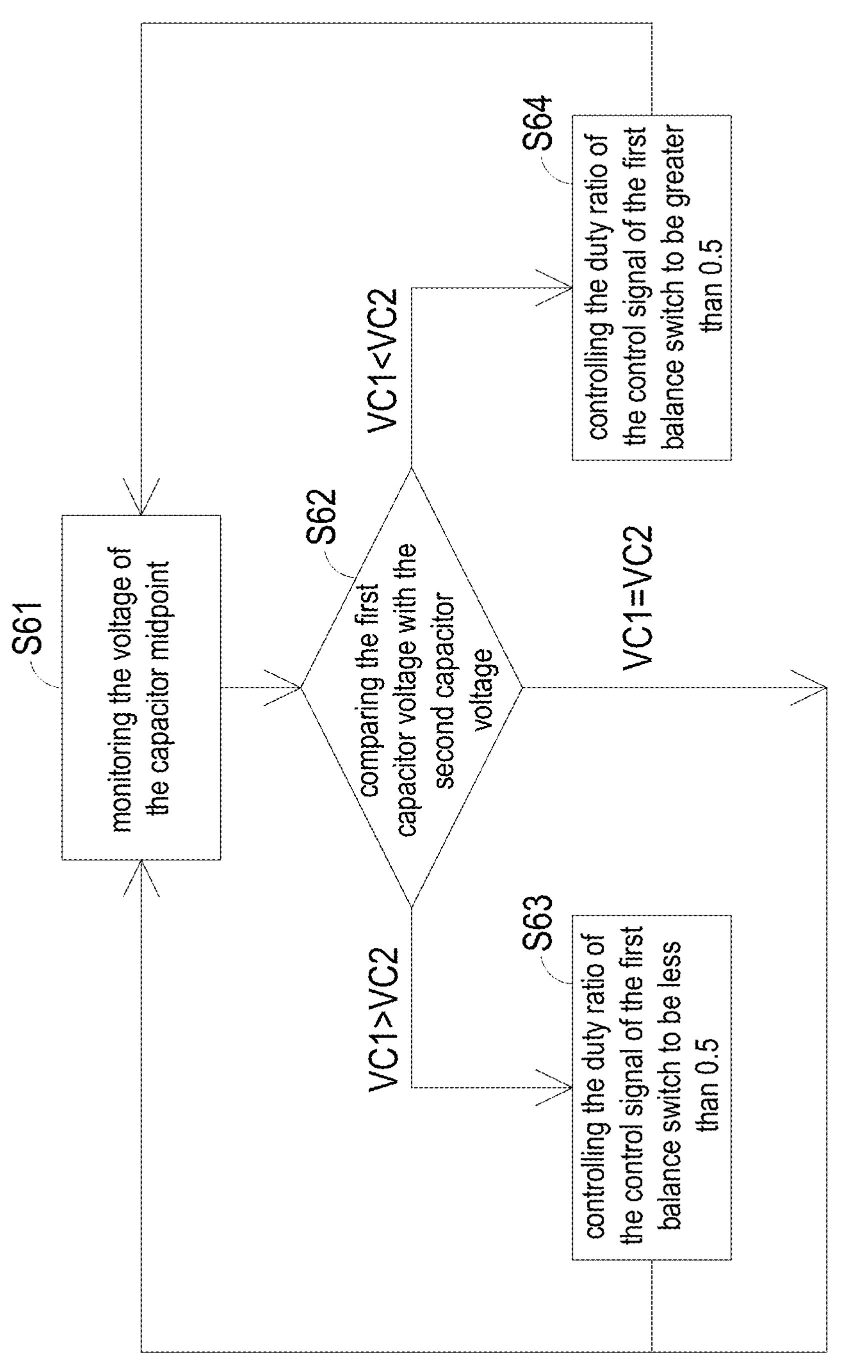
FIG. 6 is a schematic flow chart illustrating a control method of a power conversion device of the present disclosure.

FIG. 6 is a schematic flow chart illustrating a control method of a power conversion device of the present disclosure. It should be noted that the control method described in the present disclosure is performed by the controller 14 of the power conversion device 1. As shown in FIG. 6, in the control method of the present disclosure, the voltage of the capacitor midpoint M is monitored (step S61) to obtain the magnitude relation between the first capacitor voltage across the first capacitor C1 and the second capacitor voltage across the second capacitor C2, and the switches of the balance circuit 12 are controlled accordingly to keep the first capacitor voltage and the second capacitor voltage equal. For example, in an embodiment, in the control method, the first capacitor voltage and the second capacitor voltage are compared (step S62), and the duty ratio of the control signal of the first balance switch Q1 is regulated according to the comparison result. In particular, when the first capacitor voltage VC1 is greater than the second capacitor voltage VC2, the duty ratio of the control signal of the first balance switch Q1 is controlled to be less than 0.5 (step S63) for keeping the first capacitor voltage VC1 and the second capacitor voltage VC2 equal. When the first capacitor voltage VC1 is less than the second capacitor voltage VC2, the duty ratio of the control signal of the first balance switch Q1 is controlled to be greater than 0.5 (step S64) for keeping the first capacitor voltage VC1 and the second capacitor voltage VC2 equal. When the first capacitor voltage VC1 is equal to the second capacitor voltage VC2, the balance circuit 12 is controlled to stop operating (i.e., the first balance switch Q1 and the second balance switch Q2 are controlled to remain in the off state), and then the step S61 is performed again to continuously monitor the voltage of the capacitor midpoint M. In addition, after the step S63 or S64 is performed, the step S61 is also performed again to continuously monitor the voltage of the capacitor midpoint M.

Certainly, in the steps S63 and S64, the specific magnitude of the regulated duty ratio of the control signal of the first balance switch Q1 depends on the magnitude of the difference between the first capacitor voltage VC1 and the second capacitor voltage VC2.

Figure 7:
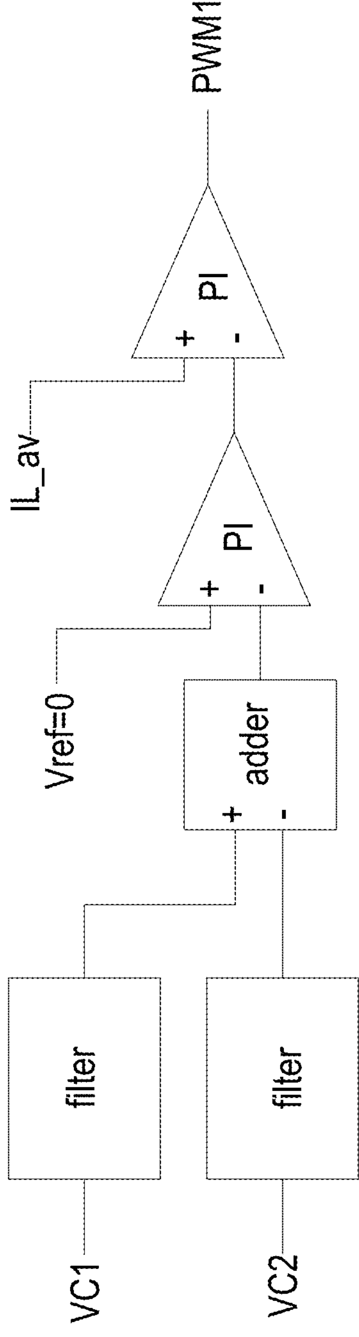
FIG. 7 is a schematic control block diagram corresponding to the control method of FIG. 6.

FIG. 7 schematically shows the digital logic circuit corresponding to the control method of FIG. 6. As shown in FIG. 7, the first capacitor voltage VC1 after filtered is compared with the second capacitor voltage VC2 after filtered, and the difference therebetween is compared with a reference voltage Vref which is equal to zero. After a comparison result is gained processing by a proportional-integral, the comparison result after gained processing is outputted to the current control loop as the gain of the negative feedback of the voltage loop. The value inputted to the current control loop by the previous stage is compared with an average current IL_av of the inductor L. After a comparison result is gained processing by the proportional-integral, the comparison result after gained processing is outputted to the first balance switch Q1 as the control signal PWM1 coming from the negative feedback of the current loop, so as to control the first balance switch Q1 to achieve midpoint voltage balance. In this embodiment, the magnitude of the duty ratio of the control signal PWM1 of the first balance switch Q1 depends on the difference between the first capacitor voltage VC1 and the second capacitor voltage VC2, and the magnitude of the duty ratio of the control signal PWM1 of the first balance switch Q1 also depends on the average current IL_av of the inductor L.

In an embodiment, the control method of the present disclosure further compares the absolute value of the difference between the first capacitor voltage VC1 and the second capacitor voltage VC2 with a preset threshold. If the absolute value of the difference is less than the preset threshold, it means that the deviation of the midpoint voltage is small, and thus the balance circuit 12 is controlled to stop operating for improving the overall efficiency. On the contrary, if the absolute value of the difference is greater than the preset threshold, the deviation of the midpoint voltage is large, and thus the duty ratios of the balance switches are regulated to achieve midpoint voltage balance.

It should be noted that, in the case that the first capacitor C1 and the second capacitor C2 bear the double grid frequency ripple current, the first capacitor voltage VC1 and the second capacitor voltage VC2 are filtered, and then the difference between the first capacitor voltage VC1 after filtered and the second capacitor voltage VC2 after filtered is obtained (as shown in FIG. 7). Thereby, the double grid frequency ripple of system is filtered out to prevent the balance switches from switching frequently, and the overall work efficiency is improved. On the other hand, in the case that the first capacitor C1 and the second capacitor C2 don't bear the double grid frequency ripple current, the difference between the first capacitor voltage VC1 and the second capacitor voltage VC2 is obtained directly without filtering the first capacitor voltage VC1 and the second capacitor voltage VC2.

The control method of the present disclosure achieves better voltage regulation rate, faster response and higher stability, and the gain of the feedback loop is higher. Through the control method of the present disclosure, the contradiction between stability and gain is not caused, and the accuracy of controlling the voltage of the capacitor midpoint M is improved.

Figure 8:
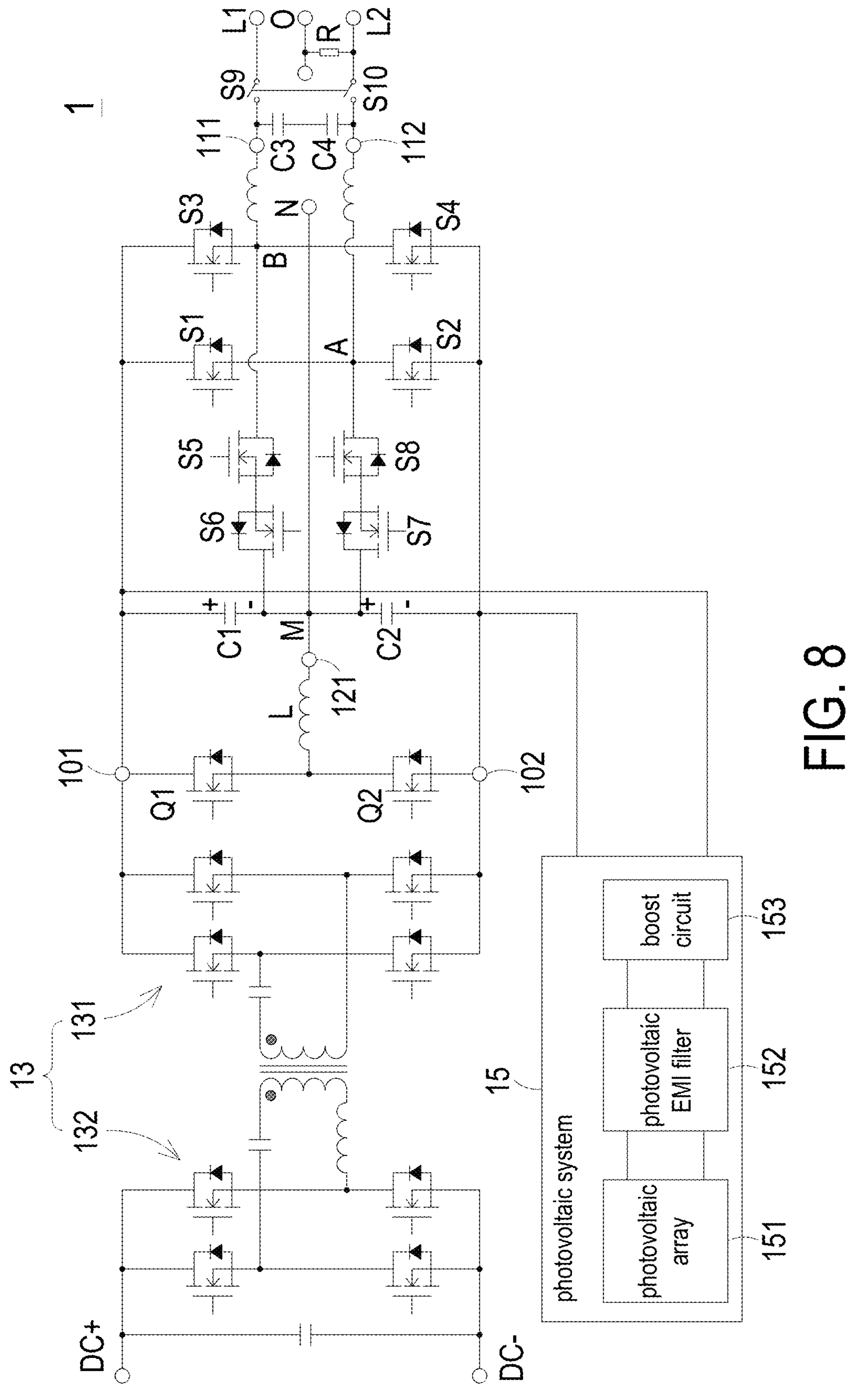
FIG. 8 is a schematic circuit diagram illustrating a variant of the power conversion device of FIG. 2.

In an embodiment, as shown in FIG. 8, the power conversion device 1 further includes a photovoltaic system 15 electrically connected to the first positive DC terminal 101 and the first negative DC terminal 102. In this embodiment, referring to FIG. 1 and FIG. 8, when the energy flows from the AC terminals L1, L2 and O to the second positive DC terminal DC+ and the second negative DC terminal DC− (grid-connected mode), the photovoltaic system 15 can provide electric energy to the second positive DC terminal DC+ and the second negative DC terminal DC− simultaneously. When the energy flows from the second positive DC terminal DC+ and the second negative DC terminal DC− to the AC terminals L1, L2 and N (off-grid mode) or the AC terminals L1, L2 and O (grid-connected mode), the photovoltaic system 15 can simultaneously provide electric energy to the AC terminals L1, L2 and N or the AC terminals L1, L2 and O. In the topology shown in FIG. 8, in the off-grid mode, the balance circuit 12 can also realize midpoint voltage balancing. In an embodiment, the photovoltaic system 15 includes a photovoltaic array 151, a photovoltaic EMI filter 152 and a boost circuit 153 electrically connected to each other. The voltage generated by the photovoltaic array 151 is filtered by the photovoltaic EMI filter 152, then boosted by the boost circuit 153, and finally served as the output voltage of the photovoltaic system 15. The output voltage of the photovoltaic system 15 is provided to the three-level inverter 11 for delivering power to the electrical grid, or is provided to the bidirectional DC-DC converter 13 for delivering power to the on-board power supply.

In an embodiment, as shown in FIG. 2, the power conversion device 1 further includes a filter circuit including filter switches S9 and S10, filter capacitors C3 and C4, and a resistor R, and the power conversion device 1 further has an AC terminal O. The filter capacitors C3 and C4 are electrically connected in series between the first AC terminal 111 and the second AC terminal 112 of the three-level inverter 11. The switch S9 is electrically connected between the AC terminal L1 and the first AC terminal 111 of the three-level inverter 11, and the switch S10 is electrically connected between the AC terminal L2 and the second AC terminal 112 of the three-level inverter 11. A first terminal of the resistor R is electrically connected to the switch S10 and the AC terminal L2, and a second terminal of the resistor R is electrically connected to the AC terminal O.

In summary, the present disclosure provides a power conversion device and a control method thereof for balancing the midpoint voltage by controlling switches of a balance circuit. Further, the capability of balancing the midpoint voltage would not be limited under any load condition and thus has great reliability.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power conversion device, comprising:

a three-level inverter, having a first AC terminal, a second AC terminal and two DC terminals, wherein the three-level inverter is configured for AC-DC power conversion;

a first positive DC terminal and a first negative DC terminal, coupled to the two DC terminals of the three-level inverter respectively;

a first capacitor and a second capacitor, wherein a capacitor midpoint is between the first capacitor and the second capacitor, two terminals of the first capacitor are coupled to the first positive DC terminal and the capacitor midpoint respectively, and two terminals of the second capacitor are coupled to the capacitor midpoint and the first negative DC terminal respectively;

a balance circuit, electrically connected between the first positive DC terminal and the first negative DC terminal, wherein the balance circuit has a neutral terminal electrically connected to the capacitor midpoint;

a bidirectional DC-DC converter, configured for DC-DC voltage conversion, wherein a first side of the bidirectional DC-DC converter is electrically connected to the first positive DC terminal and the first negative DC terminal, when the three-level inverter receives an AC power, a second side of the bidirectional DC-DC converter provides a DC power correspondingly, and when the second side of the bidirectional DC-DC converter receives a DC power, the three-level inverter provides an AC power correspondingly; and a controller, configured to control the three-level inverter, the balance circuit and the bidirectional DC-DC converter, wherein the controller controls switches of the balance circuit according to a first capacitor voltage across the first capacitor and a second capacitor voltage across the second capacitor to keep the first capacitor voltage and the second capacitor voltage equal, wherein the balance circuit comprises a first balance switch, a second balance switch and an inductor, a first terminal of the first balance switch is electrically connected to the first positive DC terminal, a second terminal of the first balance switch is electrically connected to a first terminal of the second balance switch and a first terminal of the inductor, a second terminal of the second balance switch is electrically connected to the first negative DC terminal, and a second terminal of the inductor is electrically connected to the neutral terminal, wherein a control signal of the first balance switch is complementary to a control signal of the second balance switch, and the controller compares the first capacitor voltage with the second capacitor voltage and regulates a duty ratio of the control signal of the first balance switch according to a comparison result, wherein the duty ratio is less than 0.5 when the first capacitor voltage is greater than the second capacitor voltage, and the duty ratio is greater than 0.5 when the first capacitor voltage is less than the second capacitor voltage, wherein a magnitude of the duty ratio of the control signal of the first balance switch is determined using a proportional-integral controller receiving an average current value of the inductor and an intermediate result based on a difference value between the first capacitor voltage and the second capacitor voltage.

2. The power conversion device according to claim 1, wherein the three-level inverter comprises a first switch, a second switch, a third switch and a fourth switch, two terminals of the first switch are electrically connected to the first positive DC terminal and a first switch midpoint respectively, two terminals of the second switch are electrically connected to the first switch midpoint and the first negative DC terminal respectively, two terminals of the third switch are electrically connected to the first positive DC terminal and a second switch midpoint respectively, two terminals of the fourth switch are electrically connected to the second switch midpoint and the first negative DC terminal respectively, the first switch midpoint is coupled to the first AC terminal, and the second switch midpoint is coupled to the second AC terminal.

3. The power conversion device according to claim 2, wherein the three-level inverter further comprises a first regulation switch and a second regulation switch electrically connected in series between the first switch midpoint and the capacitor midpoint, the three-level inverter further comprises a third regulation switch and a fourth regulation switch electrically connected in series between the second switch midpoint and the capacitor midpoint, and the controller regulates potentials at the first AC terminal and the second AC terminal by controlling the first regulation switch, the second regulation switch, the third regulation switch and the fourth regulation switch.

4. The power conversion device according to claim 2, wherein the three-level inverter further comprises a first bidirectional regulation switch electrically connected between the first switch midpoint and the capacitor midpoint, and the three-level inverter further comprises a second bidirectional regulation switch electrically connected between the second switch midpoint and the capacitor midpoint, the first bidirectional regulation switch and the second bidirectional regulation switch are bidirectional GaN switch components, and the controller regulates potentials at the first AC terminal and the second AC terminal by controlling the first bidirectional regulation switch and the second bidirectional regulation switch.

5. The power conversion device according to claim 1, wherein the controller regulates the duty ratio of the control signal of the first balance switch when an absolute value of a difference between the first capacitor voltage and the second capacitor voltage is greater than a preset threshold, and the controller controls the balance circuit to stop operating when the absolute value of the difference is less than the preset threshold.

6. The power conversion device according to claim 1, further comprising a filter circuit, wherein the filter circuit comprises a first filter switch, a second filter switch, two filter capacitors and a resistor, the two filter capacitors are electrically connected in series between the first AC terminal and the second AC terminal, the first filter switch is electrically connected to the first AC terminal, and two terminals of the second filter switch are electrically connected to the second AC terminal and the resistor respectively.

7. The power conversion device according to claim 1, further comprising a photovoltaic system, wherein the photovoltaic system is electrically connected to the first positive DC terminal and the first negative DC terminal, the photovoltaic system comprises a photovoltaic array, a photovoltaic EMI filter, and a boost circuit electrically connected to each other, a voltage generated by the photovoltaic array is filtered by the photovoltaic EMI filter and then is boosted by the boost circuit, and the voltage after being filtered and boosted is provided to the three-level inverter for delivering power to an electrical grid or the voltage after being filtered and boosted is provided to the bidirectional DC-DC converter for delivering power to an on-board power supply.

8. A control method of a power conversion device, comprising steps of:

(a) providing a power conversion device, wherein the power conversion device comprises a three-level inverter, a first positive DC terminal, a first negative DC terminal, a first capacitor, a second capacitor, a balance circuit and a bidirectional DC-DC converter, the three-level inverter has a first AC terminal, a second AC terminal and two DC terminals, the three-level inverter is configured for AC-DC power conversion, the first positive DC terminal and the first negative DC terminal are coupled to the two DC terminals respectively, a capacitor midpoint is between the first capacitor and the second capacitor, two terminals of the first capacitor are coupled to the first positive DC terminal and the capacitor midpoint respectively, two terminals of the second capacitor are coupled to the capacitor midpoint and the first negative DC terminal respectively, the balance circuit is electrically connected between the first positive DC terminal and the first negative DC terminal, the balance circuit has a neutral terminal electrically connected to the capacitor midpoint, the bidirectional DC-DC converter is configured for DC-DC voltage conversion, a first side of the bidirectional DC-DC converter is electrically connected to the first positive DC terminal and the first negative DC terminal, when the three-level inverter receives an AC power, a second side of the bidirectional DC-DC converter provides a DC power correspondingly, and when the second side of the bidirectional DC-DC converter receives a DC power, the three-level inverter provides an AC power correspondingly; and (b) controlling switches of the balance circuit according to a first capacitor voltage across the first capacitor and a second capacitor voltage across the second capacitor to keep the first capacitor voltage and the second capacitor voltage equal, wherein the balance circuit comprises a first balance switch, a second balance switch and an inductor, a first terminal of the first balance switch is electrically connected to the first positive DC terminal, a second terminal of the first balance switch is electrically connected to a first terminal of the second balance switch and a first terminal of the inductor, a second terminal of the second balance switch is electrically connected to the first negative DC terminal, a second terminal of the inductor is electrically connected to the neutral terminal, a control signal of the first balance switch is complementary to a control signal of the second balance switch, and the step (b) of the control method comprises a sub-step of:

(b1) comparing the first capacitor voltage with the second capacitor voltage, and regulating a duty ratio of the control signal of the first balance switch according to a comparison result, wherein the duty ratio is less than 0.5 when the first capacitor voltage is greater than the second capacitor voltage, and the duty ratio is greater than 0.5 when the first capacitor voltage is less than the second capacitor voltage, wherein a magnitude of the duty ratio of the control signal of the first balance switch is determined using a proportional-integral controller receiving an average current value of the inductor and an intermediate result based on a difference value between the first capacitor voltage and the second capacitor voltage.

9. The control method according to claim 8, wherein the three-level inverter comprises a first switch, a second switch, a third switch and a fourth switch, two terminals of the first switch are electrically connected to the first positive DC terminal and a first switch midpoint respectively, two terminals of the second switch are electrically connected to the first switch midpoint and the first negative DC terminal respectively, two terminals of the third switch are electrically connected to the first positive DC terminal and a second switch midpoint respectively, two terminals of the fourth switch are electrically connected to the second switch midpoint and the first negative DC terminal respectively, the first switch midpoint is coupled to the first AC terminal, the second switch midpoint is coupled to the second AC terminal, and the control method further comprises controlling the AC-DC power conversion by controlling the first switch, the second switch, the third switch and the fourth switch.

10. The control method according to claim 9, wherein the three-level inverter further comprises one or more regulation switch electrically connected in series between the first switch midpoint and the second switch midpoint, and the control method further comprises regulating potentials at the first AC terminal and the second AC terminal by controlling the one or more regulation switch.

11. The control method according to claim 8, wherein in the sub-step (b1), the duty ratio of the control signal of the first balance switch is regulated when an absolute value of a difference between the first capacitor voltage and the second capacitor voltage is greater than a preset threshold, and the balance circuit is controlled to stop operating when the absolute value of the difference is less than the preset threshold.

12. The control method according to claim 8, wherein the sub-step (b1) comprises:

comparing the first capacitor voltage with the second capacitor voltage to obtain a difference between the first capacitor voltage and the second capacitor voltage;

comparing the difference with a reference voltage to generate a first comparison result, and comparing the first comparison result with an average current of the inductor to generate a second comparison result; and generating the control signal of the first balance switch according to the second comparison result.

13. The control method according to claim 12, wherein the sub-step (b1) further comprises filtering the first capacitor voltage and the second capacitor voltage before comparing the first capacitor voltage with the second capacitor voltage.

* * * * *